Jan. 11, 1966  D. W. HAMM  3,228,704
COMBINATION OIL AND COMPRESSION RING
Filed July 23, 1962  2 Sheets-Sheet 1

INVENTOR.
DOUGLAS W. HAMM
BY Price & Heneveld
ATTORNEYS

INVENTOR.
DOUGLAS W. HAMM
BY
ATTORNEYS

United States Patent Office 3,228,704
Patented Jan. 11, 1966

3,228,704
COMBINATION OIL AND COMPRESSION RING
Douglas W. Hamm, Norton Township, Muskegon County, Mich., assignor to Muskegon Piston Ring Company, Muskegon, Mich., a corporation of Michigan
Filed July 23, 1962, Ser. No. 211,488
1 Claim. (Cl. 277—138)

This invention relates to a combination piston ring in which a single ring assembly combines both a compression ring and an oil ring-expander. The invention is also characterized by the fact that the oil scraper segments are an integral part of the spacer expander structure.

Modern technology in automotive engines is demanding higher engine performance while at the same time styling and economy factors are demanding a lighter weight, more compact engine. Styling factors are demanding that the height silhouette of the engine be reduced. At the same time, the increasing demand for accessory equipment is making additional space in the engine compartment an essential, and today such space is at a premium.

This invention makes it possible to combine in a single ring groove both a compression ring and an oil ring. It also permits this to be done in a ring groove of conventional width. Thus, it effects a significant reduction in piston length and thus of engine size. At the same time, it provides a lighter weight combination than has heretofore been possible. This is most important in modern short stroke, high speed, high efficiency engines wherein the factors of inertia and momentum are particularly significant in reducing ring effectiveness. The greater the weight of the ring assembly, the more effective are these forces, and the greater their tendency to unseat the ring from its sealing engagement with the walls of the ring groove and thus to reduce its effectiveness as a seal. This invention holds the mass and weight of the ring combination to a minimum without sacrifice of ring effectiveness either as a seal for oil or combustion gases.

In some very high efficiency engines which are supercharged or turbo-charged, the combustion chamber pressures are such that additional compression ring sealing must be provided. With conventional rings, this requires an additional or fourth ring groove. This invention eliminates this by making it possible to add, in the existing third groove, an additional combustion gas seal or compression ring. Thus, the additional seal to control blow-by is added without increase in piston length and engine size. Even in conventional engines this is an important factor. With greater emphasis being placed on elimination of blow-by because of its causative relationship to smog, this invention permits an additional compression ring to be added without change in the engine structure. Thus, the invention represents a marked contribution to blow-by control.

These and other objects and advantages of this invention will be immediately understood by those acquainted with the design and manufacture of engines upon reading the following specification and the accompanying drawings.

In executing the objects and purposes of this invention there is provided a combination compression and oil ring-expander designed to function cooperatively within a single ring groove. The ring combination includes a compression ring and an oil ring-expander. This latter component is so termed because the oil ring and the expander are integral and thus, a single part has a dual function. The oil scraper portion of the oil ring-expander is integral with the expander spacer portion producing a two-piece, compression and oil ring combination. The expander spacer portion of the oil ring-expander serves as an axial support and radial tension applying structure for the compression ring, as well as for the oil scraper segements which form an integral part of the oil ring-expander.

Figure 3:
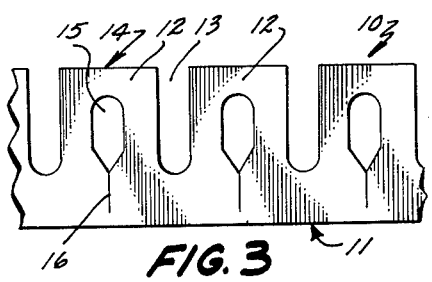
FIG. 3 is a fragmentary, plan view of a blank for making the oil ring-expander of this invention.

Referring specifically to the drawings, the numeral 10 refers to a blank which may be formed of any suitable material such as steel (FIG. 3). The blank 10 has one straight edge 11 extending laterally from which are fingers 12 spaced from one another by blind slots 13. These slots open through the other edge 14 of the blank. Preferably, an aperture 15 is provided in each of the fingers 12. The size and shape of these apertures 15 are not essential. However, the apertures of larger size are desirable as a factor in reducing weight and increasing openness of the finished ring.

Each of the apertures has a rounded end and a pointed end. When the ribbon of material is in the form of the blank illustrated in FIG. 3, a score line 16 extends from the pointed end of each of the apertures 15 almost to the edge 11. This score line penetrates only a portion of the thickness of the metal of the blank.

Figure 3A:
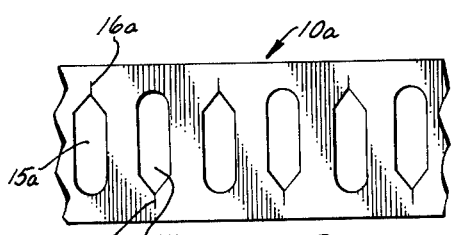
FIG. 3a is a fragmentary, plan view of a modified blank for making the oil ring-expander of this invention.

It will be recognized that an aperture and score line identical to 15 and 16 may be substituted for the blind slots 13 without in any way changing the basic structure of function of this invention. Such a construction is illustrated in FIG. 3a wherein in the blank 10a the substituted aperture and score line are identified as 15a and 16a respectively.

Figure 1:
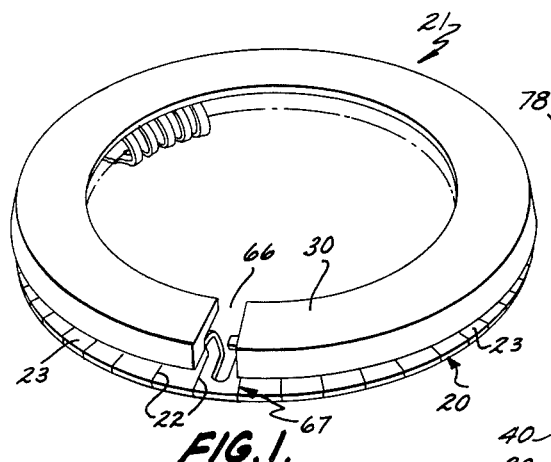
FIG. 1 is an oblique view of a piston ring combination constructed according to this invention.
Figure 2:
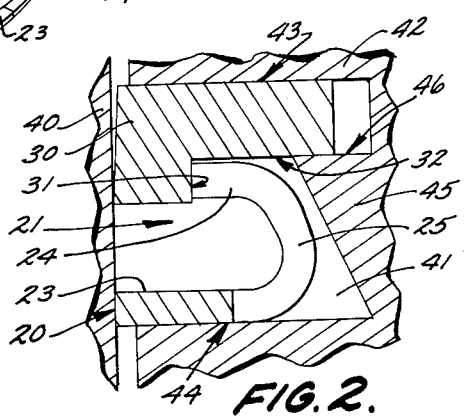
FIG. 2 is an enlarged, fragmentary, sectional, elevation view of a piston ring combination constructed according to this invention installed in a ring groove.
Figure 4:
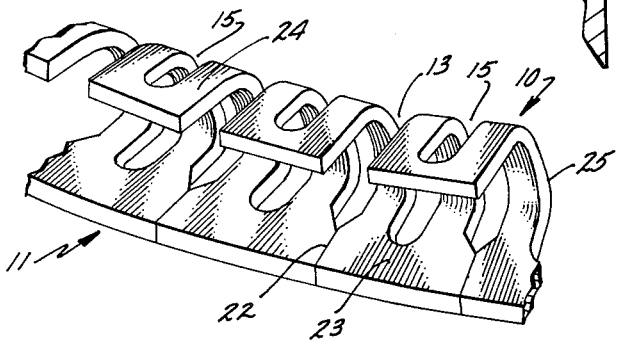
FIG. 4 is a fragmentary, oblique view of the blank of FIG. 3 after it has been bent to shape.

To form the lower portion or oil ring-expander 20 of the ring assembly 21 illustrated in FIGS. 1 and 2, the blank is first bent in the general U-shaped cross section in which it is to be used. It is then heat treated and, while hot, coiled in a helical of the desired diameter. In this step the edge 11 is caused to assume a true circular shape since, at this time, it is a continuous strip of metal. The blank, after coiling is cooled to render it brittle hard. The blank is then processed to rupture it at each of the score lines 16 to form a separation 22 (FIGS. 1 and 4). The separations 22 divide the land or oil scraper portion of the oil ring-expander into a plurality of separate and radially independent land or oil ring segments 23, each of which has an outer edge which is a true segment of a circle.

The oil ring-expander is then heat treated and drawn or stretched to open slightly the separations 22 so that the final ring will have proper radial tension. It is then heat treated to the proper hardness for its ultimate use. This method of making piston rings is more fully described in United States Patent 2,668,131 entitled "Method of Making Piston Rings," issued February 2, 1954. While the above method of fabricating the oil ring-expander is described as a preferred method, it is not the only method by which the oil ring-expander can be made. The particular method by which the oil ring-expander is manufactured is not to be considered a limitation upon this invention.

The bending and coiling of the blank into the oil ring-expander 20 causes the ends of the fingers 12 to extend radially outwardly. These ends form pressure pads 24 which in the assembled compression oil ring transmit radial tension to the compression ring (FIG. 2). In the coiling process these ends are also curved to become segments of a circle whereby they will bear firmly and uniformly against the compression ring. The portions of the fingers between the oil scraper segments 23 and the pressure pads 24 extend generally axially, serving as struts 25 supporting the land segments and pressure pads in axially spaced position. As shown, these struts are inclined radially outwardly as they extend away from the oil scraper segments. This is necessary in the particular ring groove design illustrated in FIG. 2. However, with a ring groove of a different design, this inclination may be eliminated.

Two of the struts 25 are connected to each oil scraper segment 23. Each of these struts 25 on its opposite end is integral with a different one of the pressure pads 24. Since these struts are the only radial and axial support for the oil scraper segments 23, the scraper segments are relatively independent of each other. Each pair of struts connected to different ones of the oil scraper segments, together with their connecting pressure pads, constitutes a U-shaped spring, giving the oil-ring expander an effective degree of radial tension.

Utilized with the oil ring-expander is a compression ring 30. The compression ring is of substantial cross section. Preferably, it is a section of cast iron and, except for the step in its lower side, is similar to conventional compression rings. Its outer face may or may not have a taper. This is a matter of choice, both constructions being conventional.

On its lower side, as illustrated in FIG. 2, the compression ring 30 has a step which forms a radially inwardly facing wall 31. Inwardly of the step, the ring is of lesser axial thickness forming a rearwardly extending sealing surface 32 offset from the lower side of the ring radially outwardly of the step. The outer diameter of the compression ring 30 corresponds to the outer diameter of the land segments 23 of the oil ring-expander. Thus, both make sealing contact with the cylinder wall 40 (FIG. 2).

The compression oil ring 21 is seated in a single ring groove 41 of a piston 42. The ring groove may be of conventional height and has a conventional upper side 43 and a conventional lower side 44. The root or bottom wall of the ring groove has a radially projecting step 45 forming an upwardly facing surface 46 designed to make sealing contact with the lower sealing surface 32 of the compression ring 30. The lower portion of the projecting step is inclined downwardly and radially inwardly to provide working clearance for the oil ring-expander 20. It is the shape of this wall which necessitates the inclination of the struts 25.

Figure 5:
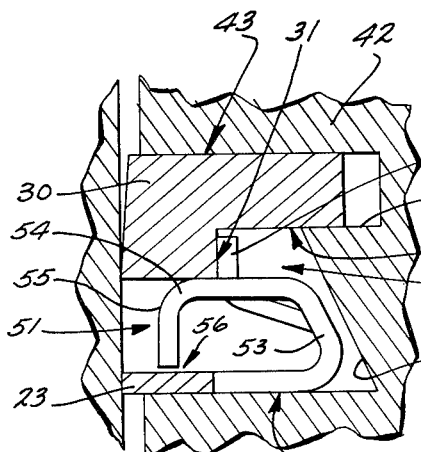
FIG. 5 is an enlarged, fragmentary, sectional, elevation view of a modified construction for the ring combination.
Figure 6:
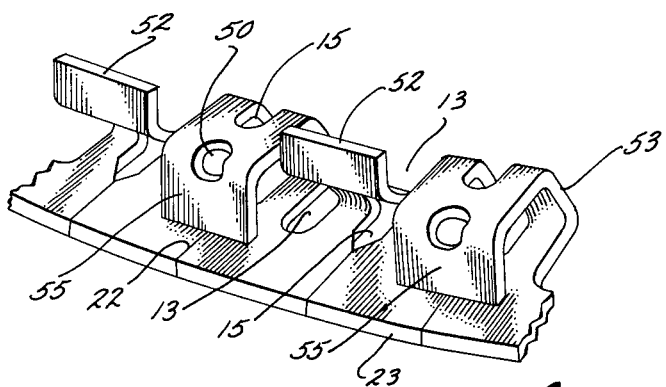
FIG. 6 is a fragmentary, plan view of a blank for the oil ring-expander illustrated in FIG. 5.
Figure 7:
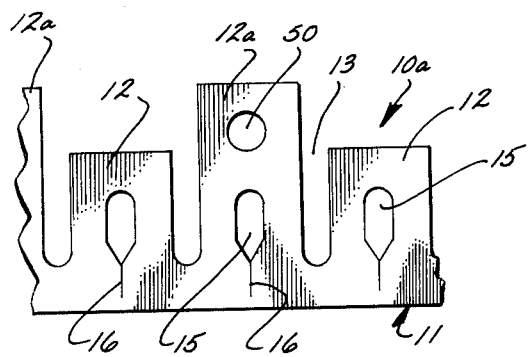
FIG. 7 is a fragmentary, oblique view of the oil ring-expander illustrated in FIG. 5.

FIGS. 5, 6 and 7 illustrate a modification of the construction illustrated in FIGS. 1–4. The same compression ring 30 is utilized and the assembly utilizes the same ring groove construction. The oil ring-expander, however, is modified. As will be seen from the blank 10a illustrated in FIG. 6, alternate fingers 12a are longer than the fingers 12. They are separated from the fingers 12 by slots 13. Both the fingers 12 and 12a have apertures 15 corresponding to the apertures 15 in the blank 10. These apertures also have score lines 16 extending toward the edge 11.

The fingers 12a, in addition to the apertures 15, each have a hole 50, the purpose of which is to facilitate bending and to reduce weight. It also improves drainage of oils which enter the ring groove. It has the further purpose of facilitating the stretching of the material after the scores 16 are ruptured. By removal of the material in the hole 50, the amount of wall to be deflected during stretching is rendered more uniform as between the fingers 12 and 12a. It will be recognized that the particular geometric form of a circular hole is a matter of design choice. The hole could be elongated in the direction of the finger. Alternatively, the aperture 15 could be elongated to incorporate the hole 50, obtaining the same basic result.

The same general method of fabrication is used to form the oil ring-expander 51 as described in connection with the oil ring-expander 20. However, in forming the ring to its cross-sectional shape, the shorter fingers 12 are bent sharply outward and their ends 52 turned to extend axially away from the land segments 23. These ends 52 form the pressure pads which engage the wall 31 of the compression ring.

The longer fingers 12a are bent to form an inclined axially extending strut 53 the inclination of which is substantially less than that of the fingers 12. They are then bent to form a ring-seat portion 54 parallel to oil scraper segment 23. The ends of the fingers 12a are bent to extend axially toward the land segment 23 forming pressure legs 55. The free ends of the pressure legs, preferably do not normally make contact with the land segments, a slight gap 56 being maintained (FIG. 5). The holes 50 are located along the bend lines where the pressure legs 55 join the ring seats 54 and facilitate the forming of this bend.

Figure 8:
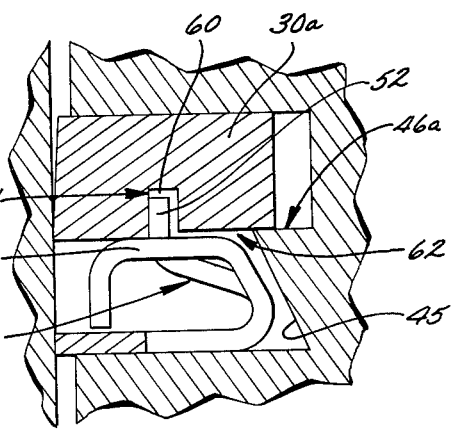
FIG. 8 is a fragmentary, enlarged sectional, elevation view of a modified ring combination similar to that illustrated in FIG. 5.

FIG. 8 illustrates a modification of the compression-oil ring combination illustrated in FIGS. 5, 6 and 7. The same oil ring-expander 51 is employed. However, the compression ring 30a, instead of a step or offset in its lower face, has an upwardly extending annular channel 60. The radially outer wall 61 of the channel is in the same radial position as the wall 31 of the compression ring 30. The width and depth of the channel 60 is such that the compression ring 30a may be readily assembled to the oil ring-expander 51 and the pressure pads 52 may move freely within the channel without binding against the inner wall or blind end of the channel.

Inwardly of the channel 60, the compression ring 30a has a sealing face 62 which cooperates with the sealing surface 46a of the ring groove. The only difference between these surfaces and the corresponding surfaces 32 and 46 shown in FIG. 5 is their axial relocation in the ring groove to accommodate the greater thickness of the radially inner portion of the compression ring 30a.

Figure 9:
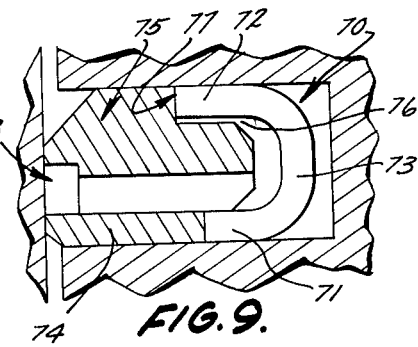
FIG. 9 is a fragmentary, enlarged, sectional, elevation view of a ring assembly in which the oil scraper portion of the ring is formed from the same basic type of blank illustrated in FIG. 3.
Figure 10:
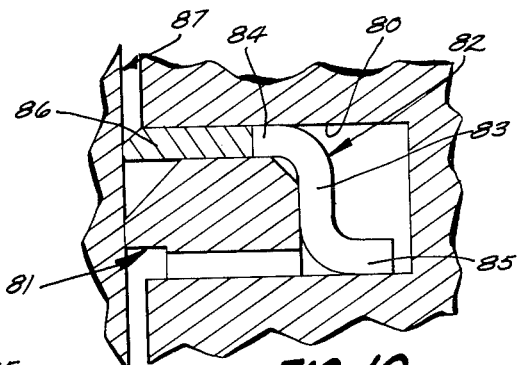
FIG. 10 is a fragmentary, enlarged, sectional, elevation view of a different ring assembly in which the oil scraper portion of the ring is formed from the same basic type of blank illustrated in FIG. 3.

FIGS. 9 and 10 illustrate another modification of this invention. In this construction the same type blank 10 is used as is illustrated in FIG. 3. However, depending upon ring depth, the fingers 12 may have to be somewhat lengthened. In this case the blank is bent into a U-shaped oil ring-expander 70 with a long leg 71 and a short leg 72 connected by axially extending struts 73. The lower or long leg 71 is made from the portion of the blank 10 adjacent the edge 11 and, by the methods previously described, is divided into a plurality of radially independent oil ring segments 74.

Assembled to the oil ring-expander 70 is a compression ring 75 having an offset 76 in the radially inner portion of its upper side. This offset forms a radially inwardly face wall 77 which engages the radial outer edge of the short leg 72 of the oil ring-expander 70. The radially inner portion of the compression ring 75 seats within the oil ring-expander 70. The outer diameter of the compression ring 75, when its part is closed, is the same as that of the oil scraper segments 74. Thus, both contact the cylinder wall 78. Thus, the axial height of the ring combination is reduced to the thickness of the compression ring plus a single thickness of the stock of the oil ring-expander. Only sufficient clearance is maintained between the adjacent radially extending surfaces of the compression ring and oil ring-expander to assure freedom of sliding movement between the parts.

This ring combination has the advantage of low axial height since the rings are telescoped one within the other. This permits the use of a narrower than normal ring groove and thus shorter piston, yet permits both an oil ring and a compression ring to be seated in the groove.

The ring combination so illustrated in FIG. 10 accomplishes basically the same ends as the ring combination illustrated in FIG. 9. Once again, the compression ring 81 is telescoped within the oil-expander 82.

The oil ring-expander 82 is made from the same blank as the oil ring-expander 70 but is bent to a Z-shaped cross section with the compression ring 81 seating against the struts 83 connecting the upper leg 84 and the lower leg 85 of the ring. The edge 11 of the blank forms the outer circumferential edge of the upper leg and is divided into a plurality of radially independent oil scraper segments 86. Since the radial position of the struts can be varied widely without affecting the tension values of the oil ring-expander, this ring is versatile in its adjustability to accommodate a wide range of radial depths in the compression ring 81. As in the other rings, the compression ring 81 has the same diameter as the oil ring-scraper so that both bear against and form a sealing contact with the cylinder wall 87.

As in the case of the ring combination illustrated in FIG. 9, the axial height of the ring combination is reduced to the thickness of the compression ring plus a single thickness of the stock of the oil ring-expander. Again, only sufficient clearance is maintained between the adjacent radially extending surfaces of the compression ring and the oil ring-expander to assure freedom of sliding movement between the parts. The radially extending lower leg 85 serves not only as part of the spring body of the oil ring-expander but also to stabilize it, supporting it against tipping within the ring groove.

In the case of all constructions of this invention, both the compression ring and the oil ring-expander have a part. Prior to installation, the part 66 in the compression ring is open while the part 67 in the oil ring-expander is closed, as shown in FIG. 1. While FIG. 1 illustrates the parts of both as being aligned, this is not necessary and in fact, most installations, non-alignment is preferable.

All of the compression oil rings which have been described above function basically in the same way. The oil ring-expander forms a support or ring seat for the compression ring. In FIG. 2 it will be seen that the radially inwardly extending portions of the fingers which connect the pressure pads 24 to the struts 25 form ring seats affording resilient but firm support for the compression ring. Both the compression rings 30 and 30a form a seal with the upper side 43 of the ring groove. The bearing between the ring and the side of the ring groove is not tight because it is essential that the compression ring have freedom of radial movement to permit its outer face to maintain positive sealing contact with the cylinder wall as the piston reciprocates. The same observation is true with regard to the fit between the oil scraper segments 23 and the lower side 44 of the ring groove.

Any combustion gases which may get behind the compression ring 30 are trapped by the seal effected between the sealing surface 32 of the ring and the sealing surface 46 of the ring groove. In the structure illustrated in FIG. 8, this seal is effected between the surfaces 62 and 46a. This seal can be tighter than the seal between the upper side of the compression ring and the upper wall of the ring groove since the area of contact is substantially smaller. Thus, a tighter fit will cause less binding and restriction in the radial movement of the compression ring. With this construction, a better seal can be obtained than is normal with the conventional compression ring which has no seal at the bottom of the ring groove and must depend upon the tortuous path formed by the ring with the upper and lower walls of the ring groove.

The oil ring-expander 20, by its very construction, when assembled with the compression ring, with its pressure pads 24 engaging the wall 31 and together with the compression ring closed to seat in the cylinder, generates substantial radial tension. The closing of the compression ring about the oil ring-expander compresses the oil ring-expander, generating significant radial tension. The amount of radial tension it develops can be controlled by selection of stock thickness of the blank and the degree of resiliency to which it is finally heat treated.

Preferably, in the constructions illustrated, in FIGS. 1-8, a slight axial clearance is maintained between the upper surface of the oil ring-expander 21 and the lower surface of the compression ring 30 so that the oil ring-expander will not interfere with the proper seating of the inner radial portion of the compression ring 30 on the surface 46. This clearance, however, is so limited that the compression ring does not have freedom to move away from the upper side of the ring groove to the point where it does not maintain an effective seal with this surface. The same is true of the relationship between the compression ring 30 and the ring seats 54 of the oil ring-expander 51. It is also true of the relationship between the compression rings 75 and 81 and their respective oil ring-expanders 70 and 82.

In the construction illustrated in FIGS. 5, 7 and 8, the pressure legs 55 serve as additional support for the ring seats 54 and the compresison ring, limiting axial compression of the ring under the extreme inertial and momentum loads incident to modern short stroke, high speed, high efficiency engines. The pressure legs also positively prevent improper assembly of the compression ring to the oil ring-expander.

This invention provides a number of advantages over previously known combination compression oil rings. It has only two components and, therefore, is easier and quicker to assemble with materially reduced possibilities of faulty assembly. Since the oil scraper portion of the ring is of the same relatively thin gauge material as the expander portion, the complete ring assembly is significantly lighter in weight. This reduces the inertial and momentum forces tending to collapse the ring and unseat the seals. Thus, the ring effects a better seal.

More important is the reduction in piston height which is made possible by this invention. The use of the same thin gauge stock for the oil scraper portion of the ring reduces the axial height of the ring as compared to rings utilizing two rails. Further, by making the oil scraper portion of the ring integral with the expander-spacer portion, the necessity of providing axial space for the metal or stock thickness of both the rail and the rail seat portion of the spacer-expander is eliminated. This construction effectively eliminates the thickness of the rail while leaving more room to form the necessary bends in the spacer-expander portion over radiuses compatible with the metal's thickness and without danger of fatigue. Thus, this invention readily permits a combination compression-oil ring to be installed in a ring groove of conventional width.

This invention makes possible the use of two ring groove pistons with a saving in piston length equal to both the distance of the land necessary between one pair of grooves and the width of the eliminated groove. This results in a significant reduction in piston length and thus of overall engine height. It also materially reduces engine weight.

Even in cases where the ring groove is made somewhat wider than conventional ring grooves, sacrificing some of the potential saving in piston length, the invention has the advantage of permitting the use of heavier compression rings in installations demanding this type of equipment.

In some of the more recent engine designs, the operating demands are such that three compression rings must be used instead of the conventional two ring installations. The advent of supercharging and turbocharging of modern reciprocating engines is creating this requirement. Further, in such engines, higher temperatures are encountered making necessary increased thermal conductivity between the piston and the cylinder wall to effect heat dissipation. In such engines this invention permits the addition of the third compression ring without an increase in piston length. This is a significant improvement in performance without increase in engine weight and height.

While three embodiments of this invention have been described, it will be recognized that modifications of this invention may be made which retain the principles of this invention. Such modifications are to be considered as included in the hereinafter appended claim unless this claim, by its language, expressly states otherwise.

I claim:

A dual purpose piston ring having a cast compression ring and an oil ring-expander formed by bending from a thin metallic ribbon; the inner radial portion of the lower side of said compression ring being recessed and the radially outer end of said recess forming an axially extending surface spaced substantially from both the inner and outer radial faces thereof; said oil ring-expander having a generally U-shaped cross section; said oil ring-expander having a finger portion and a radially outwardly extending oil scraper portion, said finger and oil scraper portions being parallel to each other, said finger portion forming axially extending struts at the inner radial face of said oil ring-expander; said finger portion extending into said recess and bearing against the axial face of the recessed portion of the lower side of said compression ring for providing axial support for said compression ring; said finger portion being divided into pressure pads, said pressure pads engaging said surface for transmitting outward radial pressure to said compression ring; said oil scraper portion being subdivided into a plurality of individual segments; the radially outer edge of said segments collectively defining a circle of the same diameter as said compression ring.

References Cited by the Examiner

UNITED STATES PATENTS

| | | | |
|---|---|---|---|
| 2,635,022 | 4/1953 | Shirk | 277—140 |
| 2,720,435 | 10/1955 | Hamm | 277—138 |
| 3,024,029 | 3/1962 | Brenneke | 277—139 |
| 3,050,354 | 8/1962 | Marien | 277—188 |
| 3,080,172 | 3/1963 | Mayfield | 277—215 X |

LAVERNE D. GEIGER, *Primary Examiner.*

SAMUEL ROTHBERG, *Examiner.*